Nov. 4, 1952 D. S. BOND 2,616,975

TIME DIVISION MULTIPLEX SYSTEM

Filed Feb. 6, 1947 3 Sheets-Sheet 1

INVENTOR.
Donald S. Bond
BY H. S. Grover
ATTORNEY

INVENTOR.
Donald S. Bond
BY H. S. Grover
ATTORNEY

TIME DIVISION MULTIPLEX SYSTEM

Filed Feb. 6, 1947 3 Sheets-Sheet 3

INVENTOR.
Donald S. Bond
BY H. S. Grover
ATTORNEY

Patented Nov. 4, 1952

2,616,975

UNITED STATES PATENT OFFICE 2,616,975

TIME DIVISION MULTIPLEX SYSTEM

Donald Spencer Bond, Philadelphia, Pa., assignor to Radio Corporation of America, a corporation of Delaware Application February 6, 1947, Serial No. 726,876

12 Claims. (Cl. 179—15)

Figure 1:
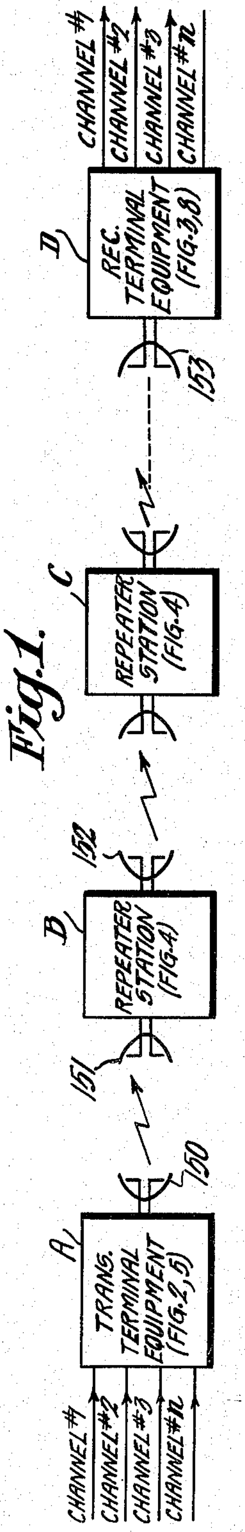

This invention relates generally to communication systems and more particularly to a multiplex system in which it is desired to transmit a plurality of voice, telegraph, or other signals simultaneously over a suitable wide frequency band transmission circuit; for example, radio, wire or other transmission line or wave guide circuit.

An object of the invention is to provide a method of and means for efficiently effecting communication over a relay system employing one or more repeater stations spaced along the line of transmission between the transmitting terminal and the receiving terminal and wherein stringent requirements are imposed on signal-to-noise ratio, cross-modulation, harmonic distortion, and similar characteristics.

Another object is to provide multiplexing means of greater simplicity and lower cost than the conventional multiplex means which employ frequency-division apparatus utilizing modulations and wave filters.

It have been demonstrated that the signal-to-noise ratio (S/N) of a multi-channel system in which a series of amplitude-modulated pulses (PAM) directly modulates the frequency of a radio-frequency carrier wave bears the following relation to the signal-to-noise ratio for a single channel amplitude-modulated system. In this relation, the successive steps of this first system are herein identified by the symbols PAM–FM, in which the symbol group PAM refers to the step of producing amplitude-modulated pulses in which the amplitudes vary in accordance with the instantaneous samples of the input wave, and the symbol FM refers to the step of frequency modulating the radio-frequency carrier by these amplitude-modulated pulses, while the symbol group AM refers to a single channel amplitude-modulated system.

$$\frac{S/N(PAM\text{–}FM)}{S/N(AM)}=\frac{\pi}{12}\frac{B}{n^{3/2}f_m} \quad \text{Eq. (1)}$$

where B is the total band-width of the R.-F. spectrum of the complex wave constituting the final output wave, $n$ is the number of channels, and $f_m$ is the maximum audio frequency of each channel.

However, the PAM–FM system is inadequate in an important respect in relay systems having a considerable number of spaced repeater stations arranged in tandem, because the intra-channel distortion increases progressively due to the difficulty of demodulating, amplifying, and modulating with the AM pulses in a strictly linear fashion.

Briefly stated, my invention provides a multiplex system which is characterized by high signal-to-noise ratio, low cross-modulation and low harmonic distortion and relatively simple and inexpensive terminal equipment. This invention has particular usefulness in systems employing a large number of spaced repeater station in tandem. These advantages are achieved, in part, by causing the signal in each channel to produce a series of amplitude-modulated D.-C. pulses (PAM), utilizing these pulses to frequency modulate (FM) a sub-carrier wave whose frequency is considerably higher than the maximum frequency of the signal in the channel, and causing the resultant frequency-modulated sub-carrier wave to frequency modulate (FM) a radio frequency carrier of higher frequency than the sub-carrier. The steps in this method of operation of the invention are herein identified by the symbols PAM–FM–FM where the symbol group PAM refers to pulse amplitude modulation, and FM to frequency modulation. In practicing the multiplex system of the invention, each cycle of operations comprises a series of pulses constituted by a pulse from each channel sequentially followed by individual pulses from the other channels in a predetermined order. Thus, each cycle comprises a pulse from, let us say, channel #1, followed by a pulse from channel #2, then followed by a pulse from channel #3, etc. up to and including the $n$th or last channel. The next cycle will repeat this sequence in the same order. Each cycle may include one or more synchronizing pulses to establish the reference time for each cycle. At the receiving terminal, the foregoing steps are reversed to derive the frequency-modulated sub-carrier, the combined PAM signal, the separate channel groups of pulses, and finally the original signal for each channel. At intermediate repeater or relay stations, the frequency-modulated sub-carrier is derived from the received radio-frequency wave, amplified, and the amplified wave caused to frequency modulate a radio-frequency transmitter oscillator.

The present invention sacrifices to a small and unimportant degree the excellent signal-to-noise ratio of the PAM–FM system, in order to obtain the more important advantages outlined above in regard to those characteristics which are essential to systems involving a number of repeater stations in tandem. The larger the number of repeater stations employed the greater will be the degree of importance of the invention. Thus for a number of repeater stations exceeding 5 to 20, the invention becomes of increasing importance.

The theory given below demonstrates that the overall sacrifice of signal-to-noise ratio with respect to the value computed in accordance with Equation 1 is of the order of 14 db (decibels) with reasonable dimensioning of the parameters of the system. While this theory is believed to be correct, it should be understood that the invention is independent of any theory which may be advanced for the results obtained.

If the peak frequency deviation of the sub-carrier is $f_{d1}$, the sub-carrier frequency $f_{sc}$ should be about $2.5f_{d1}$, so that with modulation the peak frequency of the sub-carrier will be $$(2.5+1)f_{d1}=3.5f_{d1}$$

Then for a final modulation index of $R_2$, the minimum R.-F. bandwidth $B_{rf}$ will be $$B_{rf}=7f_{d1}R_2 \qquad \text{Eq. (2)}$$
$$=3.5B_{sc}R_2$$

when $B_{sc}$ is the sub-carrier band with and corresponds to B of Eq. 1.

The signal-to-noise ratio for a fixed band-width is modified by a factor $$\frac{\sqrt{2}f_{d2}}{2f_{sc}} \qquad \text{Eq. (3)}$$

where $f_{d2}$ is the frequency deviation produced by the sub-carrier. The mean frequency of the sub-carrier is designated $f_{sc}$. The modulation index $R_2$ is $$R_2=\frac{f_{d2}}{f_{sc}} \qquad \text{Eq. (4)}$$

thus $$\frac{S/N(PAM\text{-}FM\text{-}FM)}{S/N(AM\text{-}FM)}=\frac{1}{3.5R_2}\times\frac{\sqrt{2}}{2}R_2=\frac{1}{5} \qquad \text{Eq. (5)}$$

or $$\frac{S/N(PAM\text{-}FM\text{-}FM)}{S/N(AM)}=\frac{\pi}{60}\,\frac{B_{rf}}{n^{3/2}f_m} \qquad \text{Eq. (6)}$$

where $B_{rf}$ in Eq. 6 is the final R.-F. band-width. Equation 5 demonstrates the origin of the value of 14 db which is equivalent to the voltage ratio of one-fifth.

As an example, a comparison can be made of various modulation schemes for a system of 12 telephone channels, in each of which a 56-db signal-to-thermal-noise ratio is to be obtained. The required received powers at threshold and required rf bandwidths are given in the following table:

| | System | Required power | Required bandwidth |
|---|---|---|---|
| | | *Micromicrowatts* | *Mc.* |
| 1 | PAM-FM | 3.0 | 5.9 |
| 2 | PAM-FM-FM | 8.75 | 17.2 |
| 3 | PPM-AM | 0.26 | 49 |
| 4 | PPM-FM | 28.0 | 56.2 |
| 5 | SS-PM-FM | 8.0 | 15.8 |
| 6 | SS-AM | 17,220 | 0.12 |

The symbol SS used in the above table refers to waves obtained by amplitude modulation of a continuous carrier wave and suppression of said carrier and one of the resulting sidebands. The symbol PM refers to phase modulation, while the symbol PPM refers to pulse-phase modulation, sometimes known as pulse-position or pulse-time modulation.

It will be noted in the above table that the required power and bandwidth for system 2 are greater, respectively, than those of system 1 by the factor $(5)^{2/3}=2.92$. See Landon, RCA Review, volume 9, pages 433–482, September, 1948. In this reference, the improvement by a factor of 1.65 for cross-talk balancing is demonstrated.

When suitable weight is given to both the factors of required power and required bandwidth, it becomes evident from the practical point of view that the two PAM systems 1 and 2 in the above table are notably superior to the other time division systems, viz. systems 3 and 4 and also to system 6. For other practical and well-known considerations resulting from the use of time division methods instead of frequency division multiplex methods, systems 1 and 2 are to be preferred to system 5 of the above table.

Figure 2:
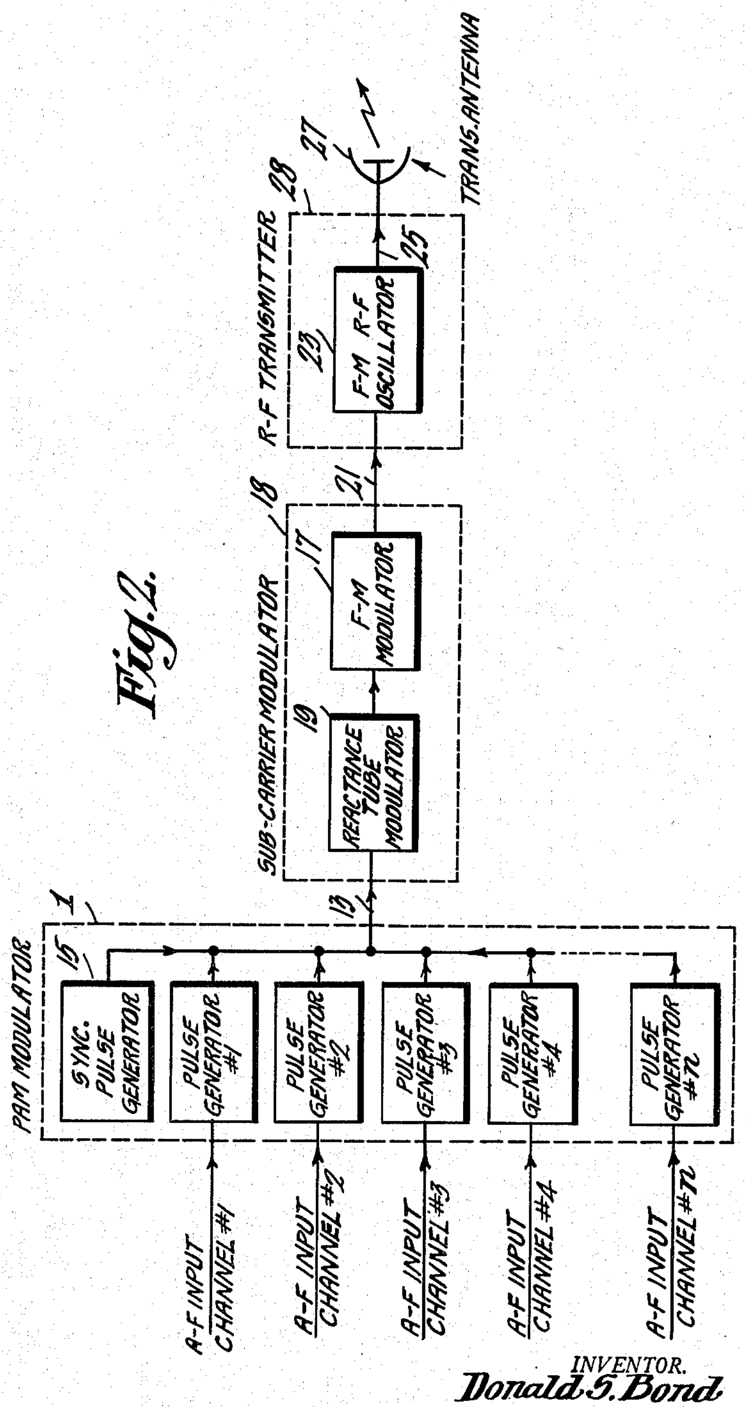
Figures 3, 4, 6A, 6B, 7:
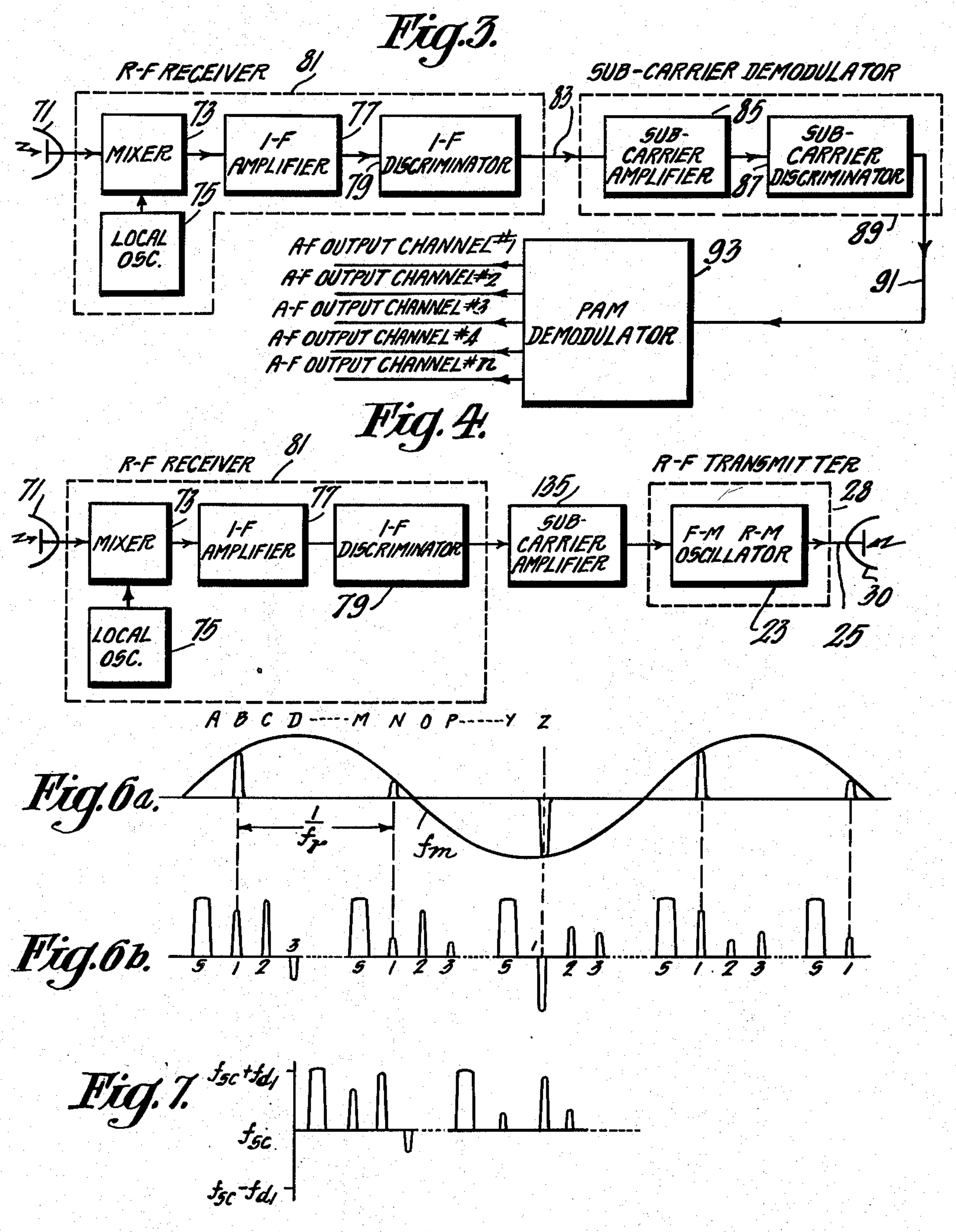
Figure 5:
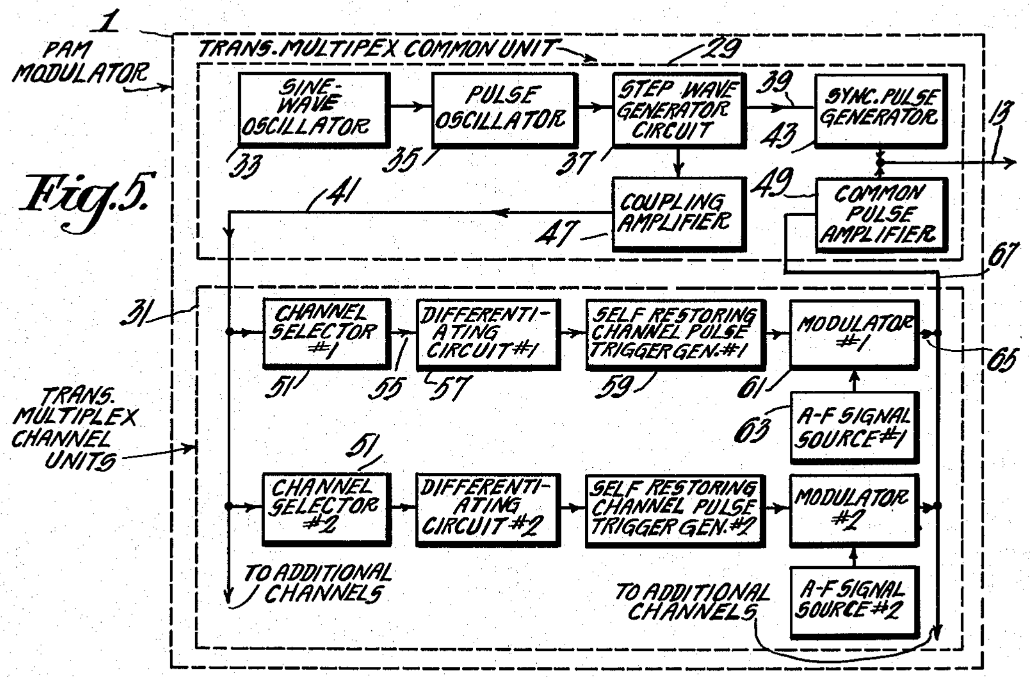
Figure 8:
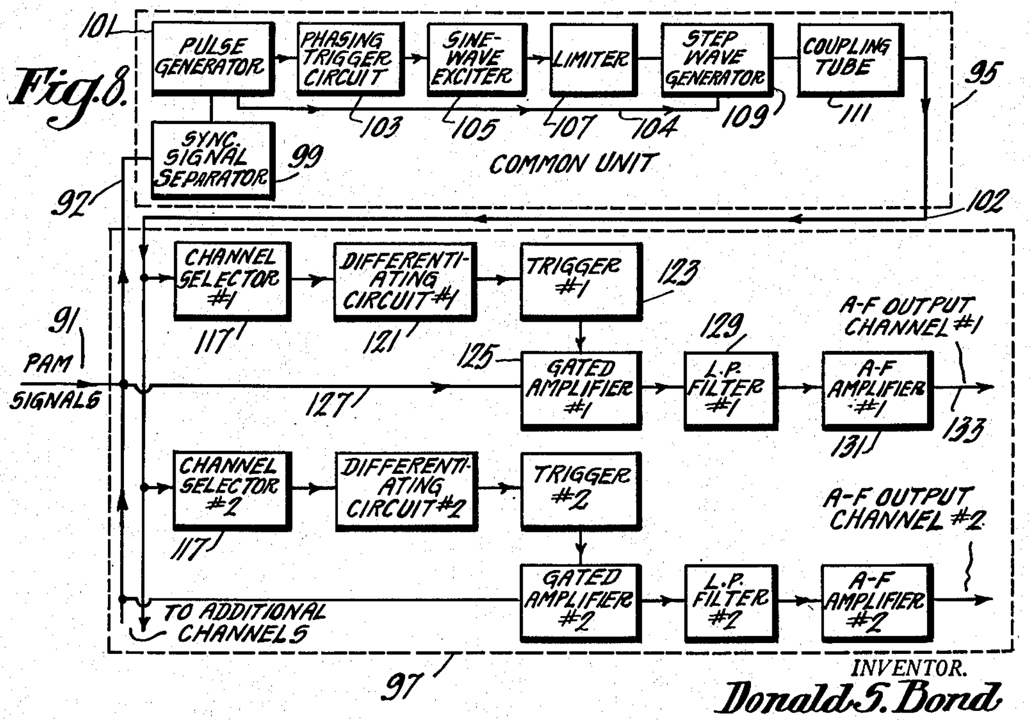

Other objects, together with the different features of the invention, will appear from a reading of the following detailed description in conjunction with a drawing, wherein:

Fig. 1 diagrammatically illustrates a relay system having a plurality of repeater stations for effecting the objects of the invention;

Fig. 2 diagrammatically illustrates in box form one embodiment of the transmitting terminal of the system of the invention;

Fig. 3 diagrammatically illustrates in box form one embodiment of the receiving terminal of the system of the invention;

Fig. 4 diagrammatically illustrates, in box form, one embodiment of a relay or repeater station which may be used in the transmission circuit between the transmitting and receiving terminals;

Fig. 5 illustrates details of the transmitting system of Fig. 1;

Figs. 6*a* and 6*b* and 7 are curves given in explanation of the operation of the invention; and Fig. 8 illustrates details of the receiving system of Fig. 2.

Fig. 1 shows diagrammatically a multiplex relay system to which the present invention may be applied. The terminal transmitting equipment is designated by box A and is supplied with separate audio signals from a plurality of different channels. The equipment in box A is illustrated in more detail in Figs. 2 and 5. The radio-frequency output from the terminal transmitter is radiated over directive antenna 150 toward the next repeater station B which has a directive receiving antenna 151 pointed toward the terminal transmitter A and a directive transmitting antenna 152 pointed toward the next repeater station C in the line of transmission. Repeater stations B and C are identical in construction and are illustrated in more detail in Fig. 4. These repeater stations are illustrative of any desired number of such stations arranged in tandem. The terminal receiving equipment is indicated by box D has a directive receiving antenna 153 pointed to receive radio signals from the nearest repeater station. This equipment is illustrated in more detail in Figs. 3 and 8, and serves to demodulate the received signals and separate the different signals into their respective channels.

The transmitting terminal equipment of the invention, shown in Fig. 2, includes a multiplicity of signal channels labeled channel #1, channel #2, etc. up to channel #*n*. There may, for example, be anywhere from 5 to 50 or more separate channels. Each channel supplies its own input signal which may be speech, telegraph, or any other suitable audio input, and these signals are independent of each other. In circuit with each channel is a pulse generator 1, 2, or 3, etc. The pulse generators for the different channels have respectively been given the same reference numerals as the channels in which they are located. The outputs from the channel pulse generators are combined in a single connection 13. A synchronizing pulse generator 15 has its output also connected to the same common lead 13. The channel pulse generators and the synchronizing pulse generator are enclosed within a dashed line box 1 labeled PAM modulator.

Each channel pulse generator produces, by means not shown, pulses at a repetition rate $f_r$ of the order of 2.5 to 3 times the highest audio frequency $f_m$ of the input signal wave for that channel. These pulses are of a magnitude proportional to and of the same algebraic sign as the modulating audio-frequency signal at the time of the pulse generation. By the term "same algebraic sign" is meant the pulses are either positive or negative depending upon the instantaneous polarity of the input signal wave. Obviously, if desired, the system can be so designed that the pulse may be of opposite polarity to the polarity of the instantaneously applied signal wave. The pulses from the channel pulse generator (for example from pulse generator #1) represent samples of the input signal wave at time intervals $1/f_r$. The other channel pulse generators, for example, pulse generators #2, #3, etc. perform the same function as generator #1 at successively later epochs in the time interval $1/f_r$. Thus, a series of $n$ (number of channels) pulses appears at common output connection 13 during this interval as a result of this PAM process. In addition, one or more characteristic synchronizing signals are generated by synchronizing pulse generator 15 during the same interval $1/f_r$ and added to the series of $n$ pulses already described and in a suitable gap in the pulse sequence. The synchronizing pulses may be distinguished from the channel pulses by duration, amplitude, occurrence in closely spaced pairs of the same or alternate polarity, or by other characteristics.

The original audio-frequency input signal wave for channel 1 is shown by the sine wave of Fig. 6*a*, while the output pulses from pulse generator #1 are also shown in Fig. 6*a* but separated by the time interval $1/f_r$. The combined pulse output from all of the channel pulse generators and the synchronizing generator is illustrated in Fig. 6*b*. The synchronizing pulse is labeled S, while the pulses from the different channels 1, 2, 3, etc. are respectively labeled 1, 2, 3, etc. It should be noted that the pulse from each channel for each frame or cycle of operations is a D.-C. amplitude-modulated pulse whose amplitude is proportional to and of the same algebraic sign as the modulating audio-frequency input wave for that channel. It should be noted that the samples of pulses from channel #1 are of positive polarity at times B and N, though of different magnitude, and of negative polarity at time Z. The synchronizing pulse S occurs once during each frame or cycle of operations and has a characteristic which is different from the amplitude-modulated pulses from the different channels. The synchronizing pulse S is shown as a single pulse of greater time duration than any of the channel pulses. It will thus be seen that the repetition rate of the pulses from the different channel pulse generators and from the synchronizing pulse generator is the same, and that the channel pulses are equally spaced apart for each frame or cycle of operations. Each cycle of operations or frame constitutes a synchronizing pulse followed by a series of spaced channel pulses extending over the interval from the beginning of one synchronizing pulse to the beginning of the next synchronizing pulse. The duration of the pulses is made to be short compared to the time intervals between them so that the different transmissions do not coincide in time. Thus the different pulse generators are assigned successive time positions within which they are allowed to operate.

The pulse-amplitude-modulated channel signals and the synchronizing pulse in common connection 13 modulate the frequency of oscillator 17 by means of reactance tube modulator 19. Apparatus 19 and 17 are located within a dashed line box 18 labeled sub-carrier modulator. The frequency of the sub-carrier wave from oscillator 17 at output connection 21 is caused to deviate above and below $f_{sc}$ by a peak value $f_{d1}$ as is shown in Fig. 7. The output of oscillator 17 at lead 21 is thus a wave whose amplitude is substantially constant but whose frequency is caused to vary from a mean value in accordance with the amplitude and sign of the pulses appearing on lead 13 and constituting the modulation. The group of frequencies comprising the output of the sub-carrier oscillator and appearing in lead 21 modulates the frequency of radio-frequency oscillator 23 which, in turn, is connected via R. F. transmission line 25 to the directive antenna 27.

In a typical case involving 24 voice channels in a system using the present invention, the repetition rate $f_r$ of the pulses in each channel may be 8 kilocycles as a result of which the repetition rate of the pulses on connection 13 (considering the 24 channels and the synchronizing signal) is $8\times(24+1)=200$ kilocycles. The duty factor D of each pulse should be as high as possible. If D is 50 per cent of the interval between adjacent pulses on lead 13, the maximum video (D.-C. pulse) component appearing on lead 13 will be of the order of 1.6 megacycles. The duration of each pulse may be of the order of 2.5 μsec. (microsecond). If the deviation ratio $R_1$ for this component is set equal to unity, and if the previous minimum value of sub-carrier frequency of 2.5 $f_{d1}$ is assumed, then $f_{sc}=4$ megacycles. The second modulation at lead 25 may involve a radio frequency $f_{rf}=4000$ megacycles with a deviation ratio $R_2=2$. Thus a final total radio-frequency band-width of 16 megacycles is required.

Fig. 5 shows one embodiment of the PAM modulator which may be used in the transmitter system of Fig. 2. In Fig. 5 there is shown a sine wave oscillator 33 (preferably crystal-controlled) whose output transformed into the form of extremely short pulses feeds into and locks by injection a short pulse oscillator 35 whose frequency or repetition rate is the same as that of the sine wave oscillator. The short output pulses from the pulse oscillator 35 are applied to a counter or step voltage wave generator 37. The counter 37 provides two outputs, one of which is a step voltage wave which is supplied to the coupling amplifier 47 and the other of which is a synchronization pulse occurring once for each step wave cycle and which is applied via lead 39 to a synchronization pulse generator 43. The function of the step voltage wave which is applied to the coupling amplifier 47 and then to the different channels over lead 41 is to time the occurrence of each channel pulse. Lead 41 containing the output of the coupling amplifier 47 is common to all of the channels 1, 2, etc. up to channel $n$. Thus, all channels have their inputs connected together in electrically parallel relation.

All of the channels have substantially identical equipment and each includes in the order named, a channel selector 51, a differentiating circuit 57, a self-restoring trigger circuit 59 functioning as a controlled pulse generator, a modulator 61 and a source of input waves 63 which may be an audio-frequency signal source.

The channel selectors 51 for the different channels are differently biased and each channel selector is normally biased well beyond the current cut-off condition. The bias of each channel selector is so adjusted that the applied step voltage wave from the coupling amplifier causes current to flow consecutively in the different channel selectors. One channel selector conducts for each rise of voltage in the step voltage wave. Each step rise in the step wave is great enough to insure that during its occurrence the current of the corresponding biased channel selector shall be driven rapidly from beyond the cut-off condition to a zero bias value. Once a channel selector starts to conduct, the current flow therein will continue until the end of the synchronization period, when the input voltage to the channel selector drops to zero at the end of the step wave.

The circuits of apparatus 33, 35, 37, 47, and 51, have been described in great detail in copending application Serial No. 608,957 filed August 4, 1945 by W. D. Houghton, now U. S. Patent 2,531,817 granted November 28, 1950, assigned to the common assignee, to which reference is made.

The output from each channel selector 51 is in the form of a rectangular wave pulse which has a steep wave front at the time the selector becomes conductive, and this output is fed via lead 55 to a differentiating circuit 57 which produces a sharp impulse of a polarity and magnitude sufficient to trip or activate the self-restoring trigger circuit 59 at a time corresponding to the leading edge of the output wave from the channel selector. The differentiator circuit comprises a capacitor in circuit with a resistor. The trigger circuit 59 may comprise any suitable circuit having a stable state and an active state. By way of example, such a trigger circuit may comprise two triode vacuum tubes whose grids and anodes are interconnected regeneratively. One tube is normally conducting and the other non-conducting in the stable state, and vice versa in the active state. A tripping pulse will fire or activate the trigger circuit and cause it to change from the stable to the active state in which it will remain for a time duration dependent upon the time constants of the trigger circuit elements, after which it restores itself to the stable state. The active period of the trigger circuit may, for example, extend over a time duration of 2.5 μsec.

A positive square pulse of 2.5 μsec. duration and of a desired duty factor is obtained from the trigger circuit when it is tripped and used to turn on normally non-conductive modulator circuit 61 for the 2.5 μsec. duration. Modulator 61 is normally biased to the current cut-off condition, and it is turned on to full gain by the pulse from the trigger circuit. By way of example, the modulator 61 may comprise a pair of multigrid vacuum tubes in which the signals from trigger circuit 59 are applied to one pair of corresponding grids (the screen grids for example), in parallel whereas the audio frequency signal from apparatus 63 is applied to the corresponding control grids in push-pull. The result is a series of pulse-amplitude-modulated signals in the output lead 65 of the modulator which includes positive and negative pulses of varying amplitudes. Trigger circuit 59 can be considered as a switch to turn on the modulator 61 which then acts as an amplifier for the audio frequency signal from source 63. The output from modulator 61 is a pulse whose amplitude depends upon the instantaneous value of the signal source 63.

The video pulse outputs from the modulators in all the different channels are combined in lead 67 and fed to common pulse amplifier 49. The output from common pulse amplifier 49 combines with the video pulse output from the synchronizing pulse generator 43 to feed a common output connection 13 extending to the subcarrier modulator circuit. The output in lead 13 is shown in the curve of Fig. 6*b*. The synchronizing pulse generator 43 produces a D.-C. pulse at the end of each step voltage wave and this synchronizing pulse is of longer duration than the channel pulses. The synchronizing pulse may have a duration of 4 μsec. compared to the channel pulses of 2.5 μsec. each. This duty factor is sufficient to minimize cross modulation.

It will thus be seen that all of the pulses in lead 13 are video (D.-C.) pulses spaced from one another and occurring in a predetermined order or sequence.

The intermediate repeater station contains apparatus similar to that shown in Fig. 4. This apparatus comprises a directive receiving antenna 71 which is pointed toward the next adjacent transmitter, whether it be another repeater station or a terminal transmitting station. The receiving antenna 71 feeds a suitable heterodyning receiver indicated by the dashed line box 81, containing therein any suitable radio-frequency amplifying apparatus, a mixer or converter 73, a heterodyning oscillator 75, an intermediate-frequency amplifier 77 and an intermediate-frequency discriminator 79. The output from the intermediate discriminator 79 is in the form of a sub-carrier wave constituting the modulation on the received wave, and this sub-carrier wave is fed to a sub-carrier amplifier 135. The output energy from the subcarrier amplifier 135 is used to frequency-modulate a radio-frequency oscillator 23, contained within a dashed line box 28 labeled as a radio-frequency transmitter. The output from the radio frequency oscillator 23 is a doubly frequency-modulated wave which is fed via line 25 to a directional transmitting antenna 30 which is pointed toward the next station along the line of transmission. This next station may be another repeater station or the terminal receiving station.

Fig. 3 shows one embodiment of the receiving terminal station which includes a directional receiving antenna 71 feeding a radio-frequency receiver shown in the dashed line box 81. This receiver may include suitable radio-frequency amplifying apparatus, a frequency converter or mixer 73, a local beating or heterodyning oscillator 75, an intermediate amplifier 77, and an intermediate discriminator 79 arranged in the manner illustrated in the drawing. The output of the intermediate discriminator 79 is fed via line 83 to a sub-carrier demodulator shown in the dashed line box 89. The electrical energy on lead 83 is in the form of a sub-carrier wave constituting the modulation on the received wave. The sub-carrier demodulator 89 includes a sub-carrier amplifier 85 followed by a sub-carrier discriminator 87. The energy derived from the sub-carrier discriminator 87 appears on lead 91 and is in the form of a series of amplitude-modulated pulses and a synchronizing pulse of the form shown in Fig. 6*b*. These pulses on lead 91 are of video (D.-C.) character and are fed to the PAM demodulator shown by the dashed line box 93. This PAM demodulator is illustrated in more detail and described later in connection with the system of Fig. 8, and performs the inverse of the functions of the PAM modulator 1 of Figs 2 and 5. The outputs from the PAM demodulator 93 are in the form of the original signal waves at the transmitter, for example, speech, telegraph, or other suitable audio-frequency signals originally impressed at the transmitter. These signal waves are independent of one another and appear in the channels corresponding to the same channels at the transmitter.

Referring to Fig. 8, the video pulses on lead 91 are impressed via lead 92 upon a common unit shown within the dashed line box 95. This common unit includes a synchronizing pulse separator circuit 99 to which the video pulses are applied, a pulse generator 101 which is fed by the output of the synchronizing pulse separator, a phasing trigger circuit 103, a sine-wave exciter 105, a limiter 107, a step-wave generator 109, and a coupling tube 111, arranged as indicated. The output from the coupling tube 111 appears on lead 102 and is in the form of a step voltage wave.

In the operation of the apparatus in the common unit 95, the synchronizing pulse separator circuit 99 serves to produce a pulse corresponding to the synchronizing pulse and suppresses the channel pulses. This circuit 99 is able to do this because of the fact that the channel pulses are of shorter duration than the synchronizing pulse. The output from the synchronizing pulse separator 99 is a pulse which is applied to the pulse generator 101. This pulse generator in effect is a discharge pulse generator which produces a discharge pulse which is sent over two paths, one of which extends to the phasing trigger circuit 103 and the other of which extends via lead 104 to the step-wave generator 109.

The phasing trigger circuit 103 provides a pulse of adjustable phase for driving a sine-wave exciter vacuum tube circuit 105 having an output circuit tuned to a frequency corresponding to the frequency of the sine-wave oscillator 33 at the terminal transmitter Fig. 5. The output of this exciter 105 is fed to the limiter 107 which serves to convert the applied sine wave to peaked positive pulses, in turn, applied to the step wave generator 109. In practice, the phasing trigger circuit may comprise two vacuum tubes suitably coupled together, while the limiter may also comprise a pair of vacuum tubes.

The step-wave generator 109 comprises several vacuum tubes whose function is to produce a step-wave voltage having a plurality of steps corresponding to the number of channels of the system. The discharge pulse supplied from the pulse generator 101 via lead 104 to the step-wave generator 109 serves to terminate the step-wave voltage after a desired number of risers or steps. The output from the step wave generator is passed through a coupling vacuum tube 111 and then via lead 102 to the various channel selectors 117 of the different channel units, it being understood that there are as many channel units as there are channels in the system. The different channel units fed by energy in the lead 102 are shown within a dashed line box 97. The apparatus within dashed line box 97 may be called the receiving multiplex channel system.

The channel selectors 117 for the different channels are differently biased so as to become conductive on different risers or steps of the applied step-wave voltage from lead 102. It will thus be seen that the common unit 95 serves to separate the synchronizing pulse from the channel pulses and to generate a suitable timed voltage wave for energizing successively the channel selectors 117 in the different channel units, it being understood that the apparatus in the different channel units of the receiving multiplex system are substantially identical.

The apparatus hereinabove described as comprising the common unit 95, and channel selectors 117 are described in considerable detail in copending application, Serial No. 673,746, filed June 1, 1946 by J. R. Day, assigned to the common assignee. The channel selector 117 is similar to the channel selector 51 in the transmitting multiplex system of Fig. 5.

The output from each channel selector 117 is a rectangular wave pulse having a step wave front at the time that the particular channel selector vacuum tube becomes conductive in response to a particular rise in the applied step voltage wave on lead 102. By means of differentiator circuit 121 comprising a capacitor and resistor, a sharply peaked pulse is derived of a polarity and magnitude sufficient to trip the self-restoring trigger circuit 123. The trigger circuit 123 has a stable state and an active state and is turned on or tripped by the output wave from the channel selector after differentiation by circuit 121. The differentiator circuit 121 and the trigger circuit 123 are similar to and operate in the same manner as the corresponding elements 57 and 59 in the transmitting multiplex circuit Fig. 5 previously described.

When trigger circuit 123 is tripped, it turns on normally non-conductive gated amplifier 125 for a time interval only sufficient to accept and pass channel pulse #1 applied to the gated amplifier via lead 127. It should be noted that the inputs of all gated amplifiers in the different channel units are connected electrically in parallel to lead 91. The gated amplifier 125 may be a vacuum tube biased beyond the current cut-off condition. This gated amplifier then requires a suitable pulse of suitable polarity (preferably a positive pulse) from the trigger circuit 123 of sufficient magnitude to overcome the cut-off bias and cause the amplifier to become conductive. This pulse of suitable polarity from the trigger circuit 123 may be applied to the signal grid, another grid or the cathode of the gated amplifier. The time constants of the trigger circuit 123, are so chosen as to cause the gated amplifier to accept and pass the pulses for that particular channel. The output from the gated amplifier for each channel unit is a pulse of constant width and varying amplitude for each frame or cycle of operations, as illustrated by the channel pulses in Fig. 6*b*. These pulses of constant width and varying amplitude in the output of the gated amplifier of each channel are passed on to low-pass filter 129 which, in turn, passes only components up to and including the highest modulating frequency of the signal wave. The output of the low-pass filter 129 is thus the audio-frequency for that channel and it may be amplified in A. F. amplifier 131 and fed to output line 133.

Although specific circuits have been described for achieving the results of the present invention, it should be understood that circuits different from those shown in Figs. 5 and 8 may be used without departing from the spirit and scope of the invention.

What is claimed is:

1. A multiplex communications system comprising a generator of D.-C. pulses, means in each channel for modulating the amplitude of said pulses in accordance with the instantaneous values of samples of a signal wave, to produce pulses whose amplitudes are proportional to and of the same algebraic sign as the instantaneous samples of the modulation wave, an oscillator in common to said channels and producing oscillations of a frequency higher than the highest modulating frequency of said signal wave, means for modulating the frequency of said oscillator by the amplitude-modulated pulses, a radio-frequency oscillator, and means for modulating the frequency of said radio-frequency oscillator by the frequency-modulated output of said first oscillator.

2. A multiplex communications system having for each channel a source of audio waves, a generator of spaced D.-C. pulses occurring at a rate of the order of 2.5 to three times the highest modulating frequency of said source, means for modulating the amplitudes of said pulses in accordance with the values of instantaneous samples of the audio waves such that the resulting D.-C. amplitude modulated pulses have an amplitude proportional to the instantaneous modulating audio wave and of a predetermined algebraic sign relative to the sign of the instantaneous sample of the modulating wave; a first radio frequency oscillator in common to the outputs of said channels, a reactance tube modulator for said oscillator, connections to said modulator from said channels for modulating the frequency of said oscillator by said amplitude-modulated pulses, a second radio-frequency oscillator producing oscillations of a frequency appreciably higher than the frequency of the oscillations produced by said first oscillator, and means for modulating the frequency of said second oscillator by the frequency-modulated output of said first oscillator.

3. A pulse multiplex system comprising a plurality of channels each including a generator of time spaced D.-C. pulses and means for modulating the amplitudes of said pulses in accordance with the values of instantaneous samples of a signal wave, a common output circuit for the pulses from said channels, means for causing the pulses from said channels to occur sequentially in a predetermined order and in non-overlapping time relation, a sub-carrier oscillator coupled to said common output circuit and producing a wave whose mean frequency is higher than the highest modulating frequency of said channels, means for modulating the frequency of said sub-carrier oscillator by the pulses in said common output circuit, a radio-frequency oscillator producing oscillations whose mean frequency is appreciably higher than the mean frequency of said sub-carrier oscillator, and means for modulating the frequency of said radio-frequency oscillator by the frequency-modulated output from said sub-carrier oscillator.

4. In a pulse type multiplex communication system, a plurality of channels each having a normally non-conductive channel selector vacuum tube, a step-wave generator supplying the inputs of the different channel selectors in parallel with a recurring step-voltage wave having a plurality of steps of different voltage values, said channel selectors being differently biased to become conductive in a predetermined order on different steps of the applied step-voltage wave, a generator of spaced D.-C. pulses for each channel controlled by the channel selector in that channel, an amplitude modulator for each channel coupled to the output of and controlled by the pulse generator of that channel, and means for applying different signal modulating waves to the different modulators, to produce in the output of each channel a series of separated D.-C. pulses whose amplitudes vary in accordance with the values of the instantaneous samples of the modulating wave and which occur at a rate higher than the highest frequency of the modulating wave for that channel, and a common output circuit for said modulators.

5. In a pulse type multiplex communication system, a plurality of channels each having a normally non-conductive channel selector vacuum tube, a step-wave generator supplying the inputs of the different channel selectors in parallel with a recurring step-voltage wave having a plurality of steps of different voltage values, said channel selectors being differently biased to become conductive in a predetermined order on different steps of the applied step voltage wave, a pulse generator for each channel controlled by the channel selector in that channel for producing a series of spaced D.-C. pulses, an amplitude modulator for each channel coupled to the output of and controlled by the pulse generator of that channel, and means for applying different signal modulating waves to the different modulators, whereby the output from each modulator is a pulse whose amplitude is proportional to the instantaneous value of samples of signal wave for that channel, a common output circuit for said amplitude modulators, a sub-carrier oscillator coupled to said common output circuit through a reactance tube modulator, whereby the frequency of said oscillator is modulated by the pulses in said common output circuit, a radio-frequency oscillator, and means for modulating the frequency of said radio-frequency oscillator by the frequency-modulated output of said sub-carrier oscillator.

6. In a pulse type multiplex communication system, a plurality of channels each having a normally non-conductive channel selector vacuum tube, a step-wave generator supplying the inputs of the different channel selectors in parallel with a recurring step-voltage wave having a plurality of steps of different voltage values, said channel selectors being differently biased to become conductive in a predetermined order on different steps of the applied step voltage wave, a self-restoring trigger circuit for each channel controlled by the channel selector in that channel and producing a D.-C. pulse when tripped into the active state, an amplitude modulator for each channel normally biased to cut-off and controlled to become conductive by the pulse produced by the trigger circuit for that channel, and means for applying separate signal waves to the amplitude modulators of the different channels, to thereby produce in the output of each modulator a series of D.-C. pulses of amplitudes varying in accordance with the instantaneous samples of the signal wave applied to the respective modulator for that channel, and a common output circuit for said modulators.

7. In a pulse multiplex system wherein a plurality of substantially equally spaced channel pulses and a synchronizing pulse are produced at the transmitter for each frame or cycle of operations and wherein the amplitude of each channel pulse is variable over a range by the signal modulation for that particular channel, a receiving system including apparatus for producing D.-C. pulses representative of said channel and synchronizing pulses, means responsive only to the D.-C. synchronizing pulse for producing a plurality of substantially equally spaced waves corresponding in number to the number of channel and synchronizing pulses in each frame or cycle of operations, a step-wave generator coupled to said means for producing a step-voltage wave having a plurality of steps or risers corresponding in number to the number of received waves for each frame or cycle of operations, a plurality of individual channel selector circuits coupled to the output of said step-wave generator, said channel selector circuits being so constructed and arranged as to become responsive on different risers of the step voltage wave, a gating circuit for each receiving channel normally biased to cut-off, a trigger circuit for each channel arranged to turn on the gating circuit for that channel, means to control each trigger circuit from the output of the channel selector circuit for that channel, a connection for supplying D.-C. channel pulses to all of said gating circuits in parallel, means for deriving from each gating circuit a pulse wave of constant width and varying amplitude corresponding to the channel pulse originally produced at the transmitter, and a low-pass filter for each channel for converting the varying amplitude pulses to the original signal modulating wave for that channel.

8. A communications system comprising a generator of pulses, a source of signals producing waves having relatively positive and negative polarity portions comprising means for deriving from said generator video pulses whose amplitude is proportional to and of the same algebraic sign as the instantaneous value of the waves from said source, an oscillator producing oscillations whose frequency is higher than the highest modulating frequency of the waves from said source, means for modulating the frequency of said oscillator by said amplitude-modulated pulses, a radio-frequency oscillator and means for modulating the frequency of said radio-frequency oscillator by the frequency-modulated output of said first oscillator.

9. In a pulse type multiplex communication system, a plurality of channels each having a normally non-conductive channel selector vacuum tube, said channel selectors being differently biased, means for causing said channel selectors to become sequentially operative in a predetermined order, a generator of spaced D.-C. pulses for each channel controlled by the channel selector in that channel, an amplitude modulator for each channel coupled to the output of and controlled by the pulse generator of that channel, and means for applying different signal modulating waves to the different modulators, to thereby produce in the output of each modulator a series of pulses of amplitudes varying in accordance with the instantaneous samples of the modulating wave applied to the respective modulator for that channel, a common output circuit for said modulators, a sub-carrier oscillator coupled to said common output circuit through a reactance tube modulator, whereby the frequency of said oscillator is modulated by the pulses in said common output circuit, a radio-frequency oscillator, and means for modulating the frequency of said radio-frequency oscillator by the frequency-modulated output of said sub-carrier oscillator.

10. In a pulse type multiplex communication system, a plurality of channels each having a normally non-conductive channel selector vacuum tube, said channel selectors being differently biased, means for causing said channel selectors to become sequentially operative in a predetermined order, a generator of D.-C. pulses for each channel controlled by the channel selector in that channel, an amplitude modulator for each channel coupled to the output of and controlled by the pulse generator of that channel, and means for applying different signal modulating waves to the different modulators, to produce in the output of each channel a series of separated D.-C. pulses whose amplitudes vary in accordance with the values of instantaneous samples of the modulating wave and which occur at a rate higher than the highest frequency of the modulating wave for that channel, and a common output circuit for said modulators.

11. In a pulse type multiplex communication system, a plurality of channels each having a normally non-conductive channel selector vacuum tube, said channel selectors being differently biased, means for causing said channel selectors to become sequentially operative in a predetermined order, a generator of spaced D.-C. pulses for each channel controlled by the channel selector in that channel, an amplitude modulator for each channel coupled to the output of and controlled by the pulse generator of that channel, and means for applying different signal modulating waves to the different modulators, to thereby produce in the output of each modulator a series of pulses of amplitudes varying in accordance with the instantaneous samples of the modulating wave applied to the respective modulator for that channel, a common output circuit for said modulators, a sub-carrier oscillator, means coupled to said common output circuit and to said sub-carrier oscillator for modulating the frequency of said oscillator, in accordance with the pulses in said common output circuit, a radio-frequency oscillator producing oscillations of a frequency higher than that of the sub-carrier oscillator, and means for modulating the frequency of said radio frequency oscillator by the frequency-modulated output of said sub-carrier oscillator.

12. In a pulse type multiplex communication system, a plurality of channels each having a normally non-conductive channel selector vacuum tube, said channel selectors being differently biased, means for causing said channel selectors to become sequentially operative in a predetermined order, a differentiator circuit coupled to the output of each channel selector, a self-restoring trigger circuit coupled to and responsive to the output of each differentiator, and a modulator coupled to the output of each trigger circuit, and means for applying different signal modulating waves to the different modulators, to thereby produce in the output of each modulator a series of pulses of amplitudes varying in accordance with the instantaneous samples of the modulating wave applied to the respective modulator for that channel, a common output circuit for said modulators, a sub-carrier oscillator, means coupled to said common output circuit and to said sub-carrier oscillator for modulating the frequency of said oscillator in accordance with the pulses in said common output circuit, a radio-frequency oscillator producing oscillations of a frequency higher than that of the sub-carrier oscillator, and means for modulating the frequency of said radio frequency oscillator by the frequency-modulated output of said sub-carrier oscillator.

DONALD SPENCER BOND.

REFERENCES CITED

The following references are of record in the file of this patent:

UNITED STATES PATENTS

| Number | Name | Date |
|---|---|---|
| 745,734 | Miner | Dec. 1, 1903 |
| 2,048,081 | Riggs | July 31, 1936 |
| 2,199,634 | Koch | May 7, 1940 |
| 2,233,183 | Roder | Feb. 25, 1941 |
| 2,262,838 | Deloraine | Nov. 18, 1941 |
| 2,282,046 | Goldsmith | May 5, 1942 |
| 2,298,409 | Peterson | Oct. 13, 1942 |
| 2,311,021 | Blumlein | Feb. 16, 1943 |
| 2,358,382 | Carlson | Sept. 19, 1944 |
| 2,403,210 | Butement | July 2, 1946 |
| 2,407,308 | Lorenzen | Sept. 10, 1946 |
| 2,412,964 | Chatterjea | Dec. 24, 1946 |
| 2,413,440 | Farrington | Dec. 31, 1946 |
| 2,421,727 | Thompson | June 3, 1947 |
| 2,458,124 | Wilmotte | Jan. 4, 1949 |
| 2,476,162 | Thompson | July 12, 1949 |
| 2,480,137 | Houghton | Aug. 30, 1949 |

OTHER REFERENCES

"Multiplex Broadcasting," Grieg.

"Electrical Communications," vol. 23, March 1946, pp. 19–26.